(12) United States Patent
Planson et al.

(10) Patent No.: US 12,270,642 B2
(45) Date of Patent: Apr. 8, 2025

(54) VEHICLE SEAT COMPRISING A DEVICE FOR MEASURING THE DISTANCE BETWEEN A BASE AND A FRAME

(71) Applicant: Faurecia Sièges d'Automobile, Nanterre (FR)

(72) Inventors: Jérôme Planson, Angerville (FR); Elie Abi Chaaya, Jouy le Moutier (FR)

(73) Assignee: FAURECIA SIÈGES D'AUTOMOBILE, Nanterre (FR)

( * ) Notice: Subject to any disclaimer, the term of this patent is extended or adjusted under 35 U.S.C. 154(b) by 116 days.

(21) Appl. No.: 18/112,412

(22) Filed: Feb. 21, 2023

(65) Prior Publication Data
US 2023/0266115 A1    Aug. 24, 2023

(30) Foreign Application Priority Data
Feb. 21, 2022    (FR) .................... FR 22 01515

(51) Int. Cl.
*G01B 7/30*    (2006.01)
*G01D 5/16*    (2006.01)

(52) U.S. Cl.
CPC ............. *G01B 7/30* (2013.01); *G01D 5/16* (2013.01)

(58) Field of Classification Search
CPC ............. G01D 5/12; G01D 5/14; G01D 5/16; G01B 7/00; G01B 7/30; B60N 2/16–163; B60N 2/0272
See application file for complete search history.

(56) References Cited

U.S. PATENT DOCUMENTS

| 2002/0137570 | A1* | 9/2002 | Castellon ................ F16D 3/06 |
| | | | 464/138 |
| 2016/0313140 | A1 | 10/2016 | Pelka et al. |
| 2017/0355282 | A1* | 12/2017 | Zouzal .................... B60N 2/10 |
| 2018/0148011 | A1* | 5/2018 | Zaugg .................... G01D 5/145 |
| 2018/0222350 | A1* | 8/2018 | Hirayama ............... B60N 2/162 |
| 2020/0101874 | A1* | 4/2020 | Sekizuka ............. B60N 2/0252 |
| 2020/0217637 | A1 | 7/2020 | Del Vecchio |
| 2021/0129712 | A1* | 5/2021 | Park ................... B60N 2/02246 |
| 2022/0155605 | A1* | 5/2022 | Lambert .............. B60N 2/0274 |

FOREIGN PATENT DOCUMENTS

| CN | 206217697 U | 6/2017 |
| EP | 3085579 A1 | 10/2016 |

OTHER PUBLICATIONS

French search report for French application No. FR 2201515, dated Sep. 14, 2022, 2 pages.

* cited by examiner

*Primary Examiner* — Huy Q Phan
*Assistant Examiner* — David B Frederiksen
(74) *Attorney, Agent, or Firm* — Reising Ethington P.C.

(57) ABSTRACT

A vehicle seat includes a base and a frame, the position of which relative to the base is adjustable by an adjustment device having at least one connecting rod articulated to the base and to the frame, the seat further including a device for measuring the distance between the base and the frame. The measuring device has an angular position sensor mounted on the base or on the frame and an arm articulated on the angular position sensor and moving in rotation when the connecting rod is moved in rotation, the angular position sensor determining the distance between the frame and the base as a function of the angle of rotation of the arm.

20 Claims, 6 Drawing Sheets

VEHICLE SEAT COMPRISING A DEVICE FOR MEASURING THE DISTANCE BETWEEN A BASE AND A FRAME

TECHNICAL FIELD

The present invention relates to a vehicle seat, of the type comprising a base and a frame, the position of which relative to the base is adjustable by an adjustment device comprising at least one connecting rod articulated to the base and to the frame, a displacement rotation of the connecting rod causing movement of the frame relative to the base to separate or bring the frame closer to the base, the seat further comprising a device for measuring the distance between the base and the frame.

BACKGROUND

The invention applies for example to height adjustment of a seat cushion, of which the frame forms a part, relative to a seat base intended to be mounted on the floor of a vehicle. Such a height adjustment makes it possible to adapt the position of the occupant of the seat to improve his comfort.

In the case of a motorized displacement of the frame to modify its position relative to the base, it is known to determine the distance between the frame and the base by counting the number of revolutions of the motor during the passage of one position to another of the frame. Such a determination makes it possible, for example, to offer specific functionalities to the seat, such as a memory of the positions occupied by the frame, making it possible to reproduce a particular setting according to the preferences of the occupants of the seat, and/or to provide users with morphological advice.

However, such a determination is only possible in the case of a motorized seat and these functionalities cannot therefore be offered for seats whose change of position is done by manual actuation, for example by means of a wheel actuated manually by the seat occupant.

SUMMARY

One of the aims of the invention is to overcome this drawback by proposing a vehicle seat provided with a measuring device also suitable for a seat whose position is manually adjustable.

To this end, the invention relates to a seat of the aforementioned type, in which the measuring device comprises at least one angular position sensor mounted on the base or on the frame and an arm articulated on said angular position sensor and extending between said angular position sensor and a part movable relative to said angular position sensor when the frame is moved relative to the base, said arm moving in rotation when the connecting rod is moved in rotation to modify the position of the frame relative to the base, said angular position sensor determining the distance between the frame and the base as a function of the angle of rotation of said arm.

The measuring device therefore does not rely on the use of a motor to move the frame relative to the base. This device can therefore be used equally well in a vehicle seat in which the movement of the frame is actuated by motor or manually and thus offer additional functionalities, in the case of a manually actuated seat. In addition, the measuring device is inexpensive and remains reliable even in the event of fouling of the measuring device. In addition, its installation is simple and can also be carried out on seats already installed in a vehicle.

The vehicle seat may include one or more of the following features, considered alone or in any technically conceivable combination:
- the angular position sensor comprises a rotating part and a measuring part whose characteristic varies according to the rotation of the rotating part, the measuring part being mounted on the base or on the frame and the arm being mounted on the rotating part of the angular position sensor, the arm driving the rotating part in rotation when said arm moves in rotation;
- the angular position sensor is mounted on the base and the movable part is integral with the frame or the connecting rod;
- the angular position sensor is mounted on the frame and the movable part is integral with the base or the connecting rod;
- the movable end of the arm comprises a fork, the movable part being formed by a crosspiece received in said fork;
- the axis of rotation of the arm on the angular position sensor coincides with the axis of rotation of the connecting rod with respect to the base or to the frame, the crosspiece being immobile with respect to the fork during movement of the frame in relation to the base;
- the axis of rotation of the arm on the angular position sensor is substantially parallel to, and separated from the axis of rotation of the connecting rod relative to the base or to the frame, the crosspiece moving in translation in the fork of the arm when the frame moves relative to the base;
- the crosspiece forming the movable part extends between two connecting rods hinged to the base and to the frame, said crosspiece extending substantially parallel to the axis of rotation of said connecting rods with respect to the base and to the frame;
- the angular position sensor is a resistive potentiometer;
- the electrical resistance of the potentiometer has a linear relationship with the angle of rotation of the arm, the distance between the frame and the base being determined by measuring said electrical resistance of the potentiometer;
- the vehicle seat further comprises a device for manual actuation of the movement of the frame relative to the base, the manual actuation of said actuation device causing movement of the connecting rod relative to the base;
- the base is a seat base intended to be mounted on a vehicle floor and the frame forms part of a seat cushion adjustable in height with respect to the seat base, the measuring device determining said height of said seat cushion.

BRIEF DESCRIPTION OF THE DRAWINGS

Other aspects and advantages of the invention will appear on reading the following description, given by way of example and made with reference to the appended drawings, in which.

DETAILED DESCRIPTION

Figure 1:
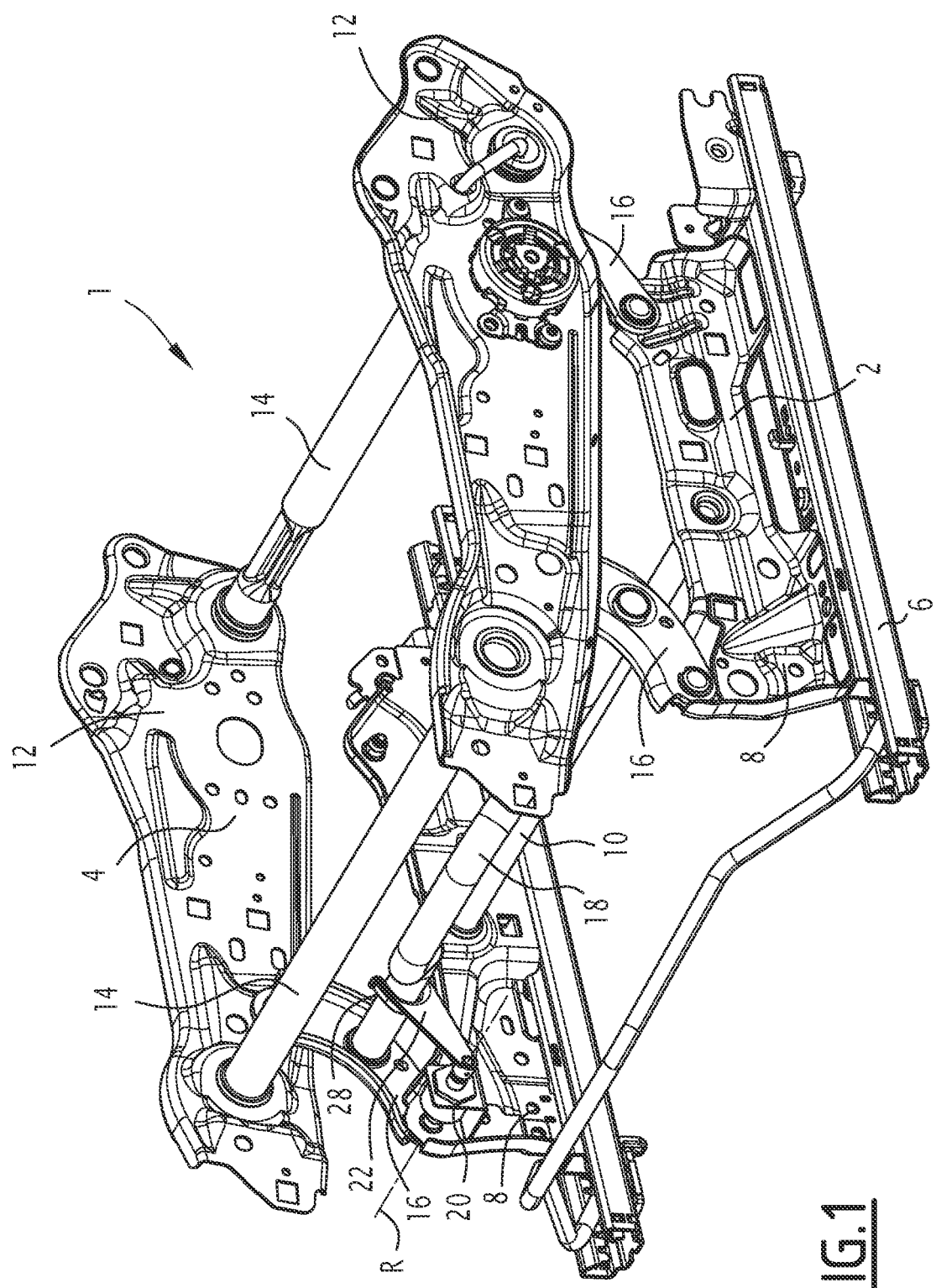
FIG. 1 is a schematic representation in perspective of part of a vehicle seat according to one embodiment of the invention.

With reference to FIG. 1, a vehicle seat 1 is described according to a first embodiment, comprising a base 2 and a movable part 4 whose position relative to the base is adjustable by an adjustment device.

The base 2 is for example a base of the vehicle seat 1 intended to be mounted on the floor of the vehicle, for example by means of a system of slides 6 making it possible to move the seat 1 according to a direction of sliding corresponding for example to a longitudinal direction of the vehicle, that is to say the front-rear direction of the vehicle. According to the embodiment represented in FIG. 1, the base 2 is formed by two sides 8 spaced apart from each other in a transverse direction substantially perpendicular to the longitudinal direction and corresponding to the width of the vehicle. The two sides 8 extend mainly in the longitudinal direction and are for example secured to each other by at least one crosspiece 10 extending in the transverse direction. Each side 8 receives a profile of the slide system 6, this profile being mounted in a sliding manner in a complementary profile of the slide system 6 and intended to be fixed to the floor of the vehicle.

The frame 4 is for example part of a seat cushion of the vehicle seat 1 on which a user of the seat sits when he enters the vehicle. In this case, the frame 4 is for example intended to receive a cushion. The frame 4 comprises for example two sides 12 extending mainly in the longitudinal direction and spaced apart from each other in the transverse direction. The frame further comprises two crosspieces 14 extending in the transverse direction and joining the sides 12 together, for example in the vicinity of the longitudinal ends of these sides 12, as shown in FIG. 1. The sides 12 of the frame extend opposite the sides 8 of the base and are spaced from the latter in a direction of elevation substantially perpendicular to the longitudinal and transverse directions and corresponding to the height of the vehicle.

The adjustment device is arranged to allow movement of the frame 4 relative to the base 2, for example in the direction of elevation in the case of a base and a seat cushion. In other words, according to the embodiment shown in the figures, the adjustment device makes it possible to adjust the height of the seat cushion.

The adjustment device comprises at least one connecting rod 16 hinged to the base 2 and to the frame 4. More particularly, the connecting rod 16 is hinged to a side 8 of the base 2 and to the side 12 of the frame 4 extending opposite the side 8 in the direction of elevation. A rotation of the connecting rod 16 with respect to the base 2 around an axis of rotation R causes a displacement of the frame 4 separating or bringing the frame 4 closer to the base 2 according to the direction of rotation of the connecting rod around the axis of rotation R. In the case of a height adjustment, the movement of the frame 4 relative to the base 2 takes place mainly in the direction of elevation. The articulation of the connecting rod 16 to the frame 4 makes it possible to maintain the orientation of the latter relative to the base 2 during the movement of the mobile part 4. The adjustment device makes it possible to move the frame 4 between a low position (FIGS. 3 and 5), in which the frame 4 is closest to the base 2, and a high position (FIGS. 4 and 6), in which the frame 4 is furthest from the base 2. The frame 4 can be placed in a plurality of intermediate positions between the low position and the high position, in which the frame 4 is more or less distant from the base 2 according to the wishes of the user of the seat. In the case of a height adjustment, it is therefore understood that the frame 4 can be placed at different heights in the low, high and intermediate positions.

As shown in FIG. 1, the adjustment device preferably comprises several connecting rods 16. Thus, at least two connecting rods 16 are provided between the base 2 and the frame 4. The two connecting rods 16 are each hinged to one of the sides 8 of the base 2 and to the side 12 facing the frame 4 and are spaced apart and facing each other in the transverse direction. In other words, each side 8 of the base 2 is connected to the corresponding side 12 of the frame 4 by at least one connecting rod 16 of the adjustment device. The two connecting rods 16 are secured to each other by a crosspiece 18 extending in the transverse direction so that the movement of a connecting rod 16 between the low and high positions causes a similar movement of the other connecting rod 16 through the crosspiece 18. The axis of rotation R of the connecting rod(s) 16 is substantially parallel to the crosspiece 18. According to one embodiment, each side 8 of the base is connected to the corresponding side 12 of the frame 4 by two connecting rods 16, for example near each longitudinal end of the sides 8 and 12.

According to one embodiment, the actuation of the adjustment device is a manual actuation by the user of the seat. The actuation thus takes place, for example, by means of a knob (not shown) mounted around the axis of rotation of one of the connecting rods 16 and integral in rotation with this connecting rod. Thus, by turning the knob, the user causes the rotation of the connecting rod 16 which causes the rotation of the other connecting rods 16 and the movement of the frame 4 between the low and high positions. As a variant, the actuation of the adjustment device can be motorized.

The vehicle seat according to an embodiment of the invention further comprises a device for measuring the distance between the base 2 and the frame 4. More particularly, the measuring device makes it possible to determine the distance between a point of the base 2 and a point of the frame 4, which makes it possible to determine the height of the frame 4 relative to the floor of the vehicle in the case of seat height adjustment.

The measuring device comprises at least one angular position sensor 20 and an arm 22 articulated on the angular position sensor 20.

According to the first embodiment shown in the figures, the angular position sensor 20 is mounted on the base 2, more particularly on a side 8 of the base 2, on or in the vicinity of the axis of rotation R of a connecting rod 16, as will be described in more detail later. The angular position sensor 20 comprises a rotating part 24 and a measuring part 26 whose characteristic varies according to the rotation of the rotating part 24. Thus, the angular position sensor 20 is for example formed by a resistive potentiometer, the characteristic of which varies according to the rotation of the rotating part 24 is the resistance. In other words, a rotation of the rotating part 24 causes an increase or a decrease in the resistance of the angular position sensor 20 depending on the direction of rotation of the rotating part 24. More particularly, the electrical resistance of the potentiometer preferably has a linear relationship with the angle of rotation of the rotating part 24. Thus, the resistance varies along a straight line as a function of the angle of rotation of the rotating part 24. By measuring the resistance of the measuring part 26, it is thus possible to know in a simple way the angle of rotation of the rotating part 24 and to deduce the distance between the base 2 and the frame 4 as will be described in more detail later. It is understood that the angular position sensor could be of another nature, as long as the rotation of the rotating part 24 causes a variation of a characteristic of the sensor which can be measured in order to deduce therefrom the distance between the base 2 and the frame 4.

The arm 22 is mounted on the rotating part 24 of the angular position sensor, close to one of its ends, so that a movement of the arm 22 causes the rotation of the rotating part 24 and therefore the variation of the characteristic of the measuring part 26 of the angular position sensor 20. The arm 22 is also connected to a movable part relative to the angular position sensor 20 when the frame 4 is moved relative to the base 2. Thus, in the case of an angular position sensor 20 mounted on the base 2, the arm 22 is connected to a movable part integral with the frame 4 or the connecting rod 16 so that the arm 22 extends between the angular position sensor 20 and this movable part and that a movement of the latter via the connecting rod(s) 16 causes a rotation of the arm 22 which causes a rotation of the rotating part 24 of the position sensor 20. Thus, according to the embodiment shown in the figures, the arm comprises a movable end, opposite its axis of rotation on the angular position sensor 20, mounted on a crosspiece integral with the frame 4 or the connecting rod 16. More particularly, according to the embodiment shown in the figures, the movable end of the arm 22 comprises a fork 28 receiving the crosspiece 18 which extends between two connecting rods 16 spaced apart in the transverse direction, corresponding to the crosspiece which is the closest to the position sensor 20 which makes it possible to reduce the length of the arm measured between its axis of rotation and its mobile end. In this case, the crosspiece 18 therefore forms the movable part to which the arm 22 is connected. It is however understood that the movable part could be formed by a crosspiece 14 extending between the two sides 12 of the frame 4, the fork 28 then receiving this crosspiece 14.

The fork 28 comprises two branches 30 spaced apart from each other and defining between them a housing for receiving the movable part. The distance between the branches 30 is substantially equal to the diameter of the crosspiece forming the movable part so that the fork 28 encloses the crosspiece and makes the arm 22 integral in rotation with the movable part. Thus, when the connecting rod 16 is moved in rotation, the movable part moves with the connecting rod 16 and the arm 22 moves in rotation with the moving part.

Figure 2:
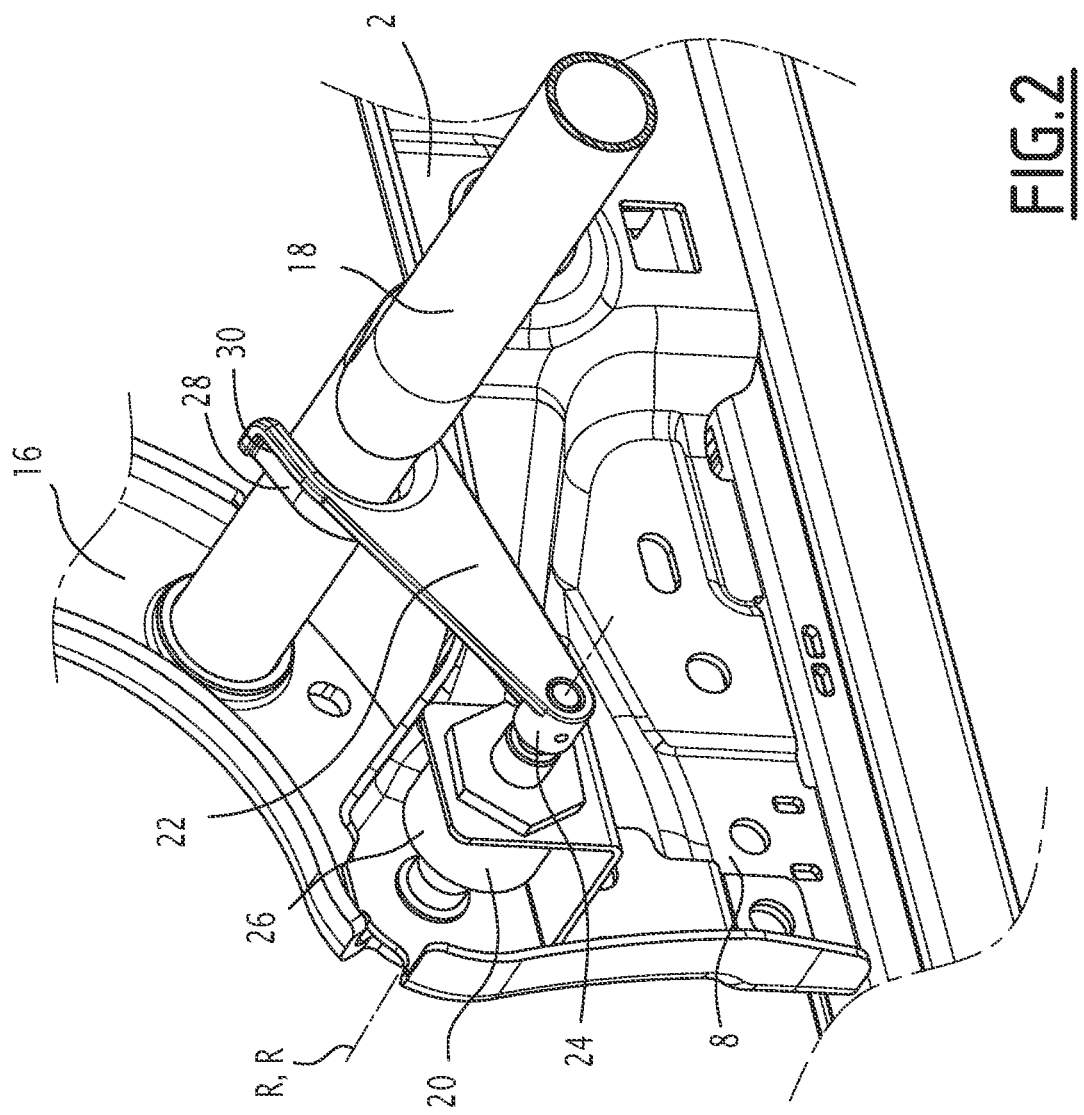
FIG. 2 is a schematic representation in perspective of an area of the seat of FIG. 1, showing the measuring device.
Figure 3:
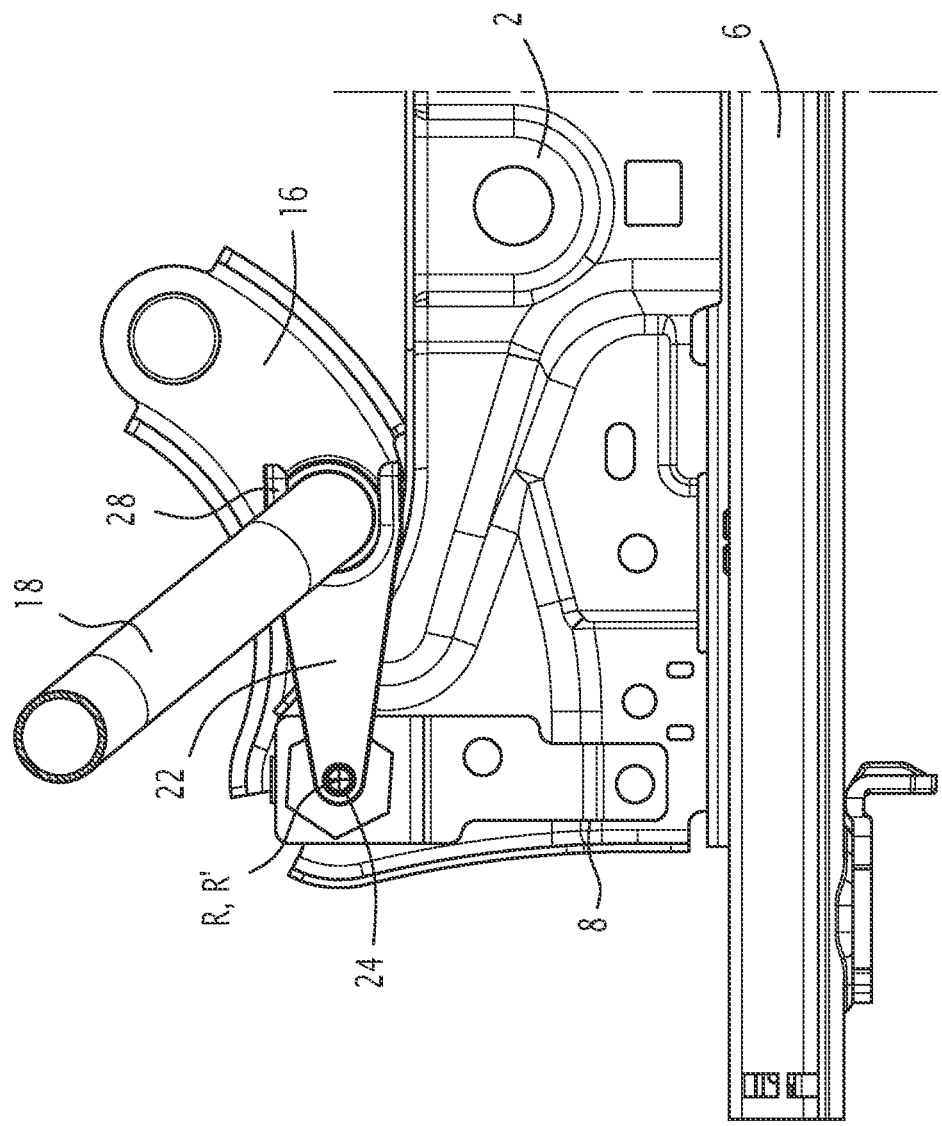
FIG. 3 is a schematic representation from the side of the seat part of FIG. 2, the frame being in a low position.
Figure 4:
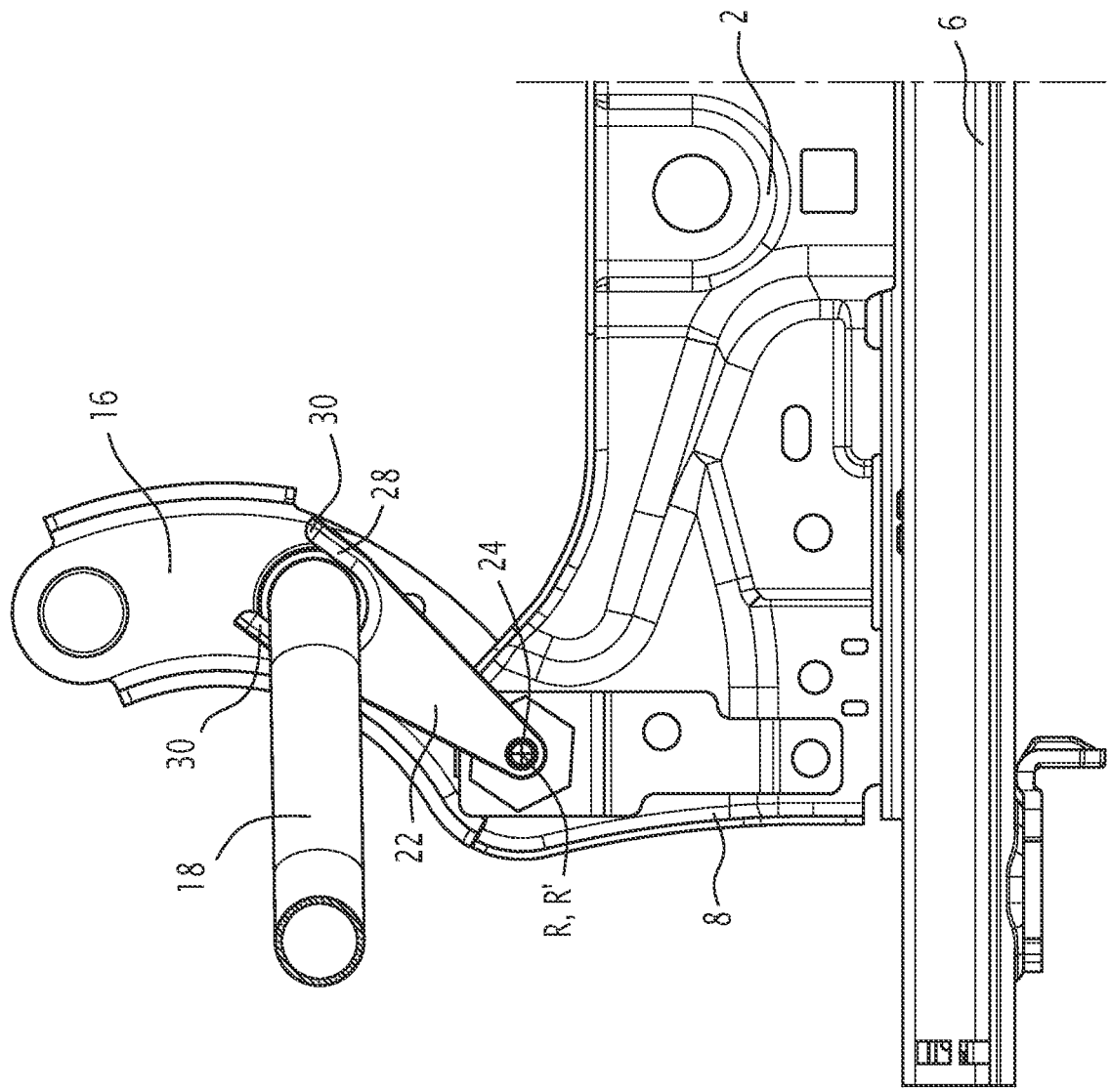
FIG. 4 is a schematic representation from the side of the seat part of FIG. 2, the frame being in a high position.

According to the embodiment of FIGS. 2 to 4, the axis of rotation R' of the arm 22, and of the rotating part 24 of the angular position sensor 20, coincides with the axis of rotation R of the connecting rod 16 with respect to the base 2. In this case, the distance between the mobile part and the axis of rotation R' of the arm 22 is constant when the frame 4 moves relative to the base 2. Thus, in this case and as can be seen in FIGS. 3 and 4 respectively showing the frame 4 in the low position and in the high position, the movable part is immobile relative to the fork 28 when the frame 4 moves relative to the base 2. According to this embodiment, the fork 28 can be adjusted to the movable part and the branches 30 of the fork 28 can have a length, measured along the length of the arm 22, close to or substantially equal to the diameter of the crosspiece 18 when this forms the movable part, as seen in FIGS. 3 and 4.

Figure 5:
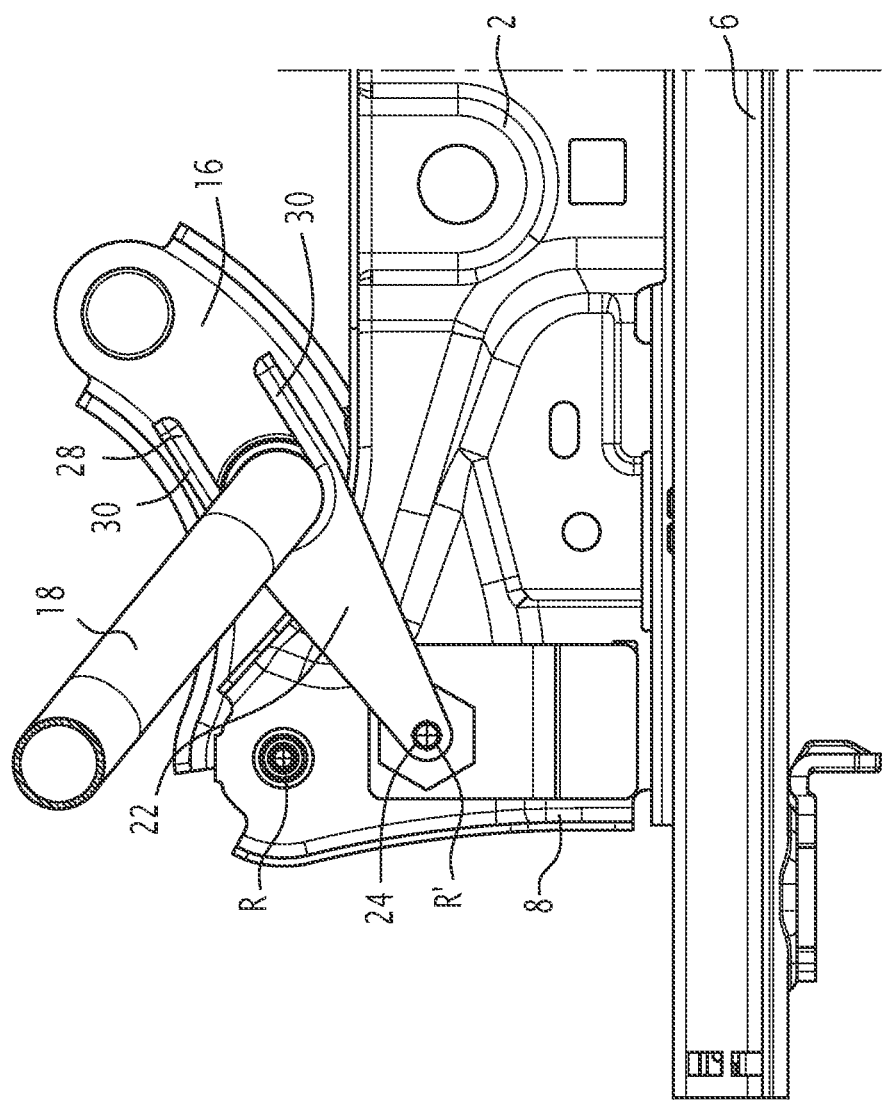
FIG. 5 is a schematic representation from the side of a seat part according to another embodiment of the measuring device, the frame being in a low position.
Figure 6:
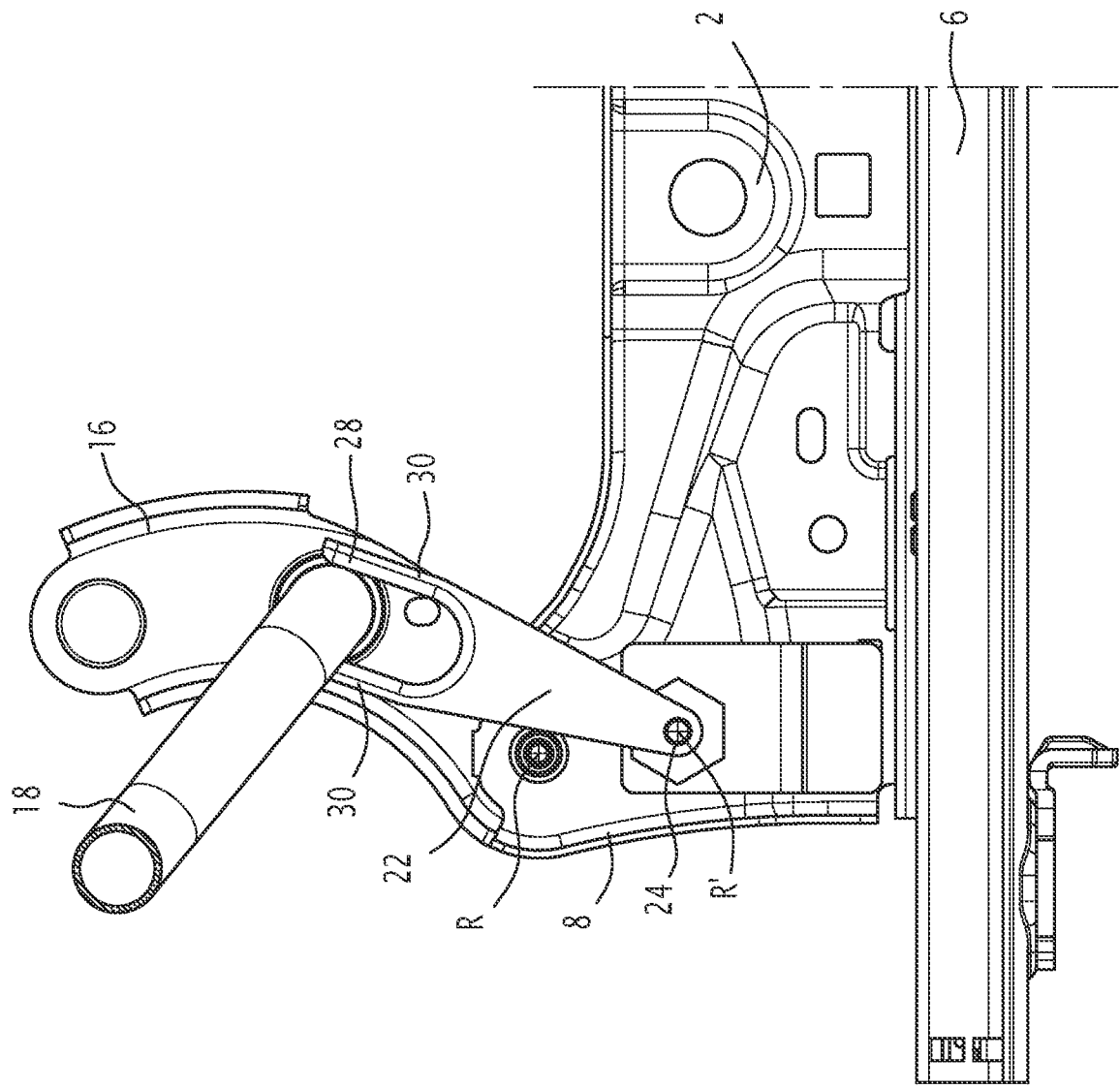
FIG. 6 is a schematic representation from the side of the seat part of FIG. 5, the frame being in a high position.

According to the embodiment of FIGS. 5 and 6, the axis of rotation R' of the arm 22, and of the rotating part 24 of the angular position sensor 20, is substantially parallel to, and separated from the axis of rotation R of the connecting rod 16 with respect to the base 2. In this case, the distance between the mobile part and the axis of rotation R' of the arm 22 varies when the frame 4 moves relative to the base 2. Thus, in this case and as can be seen in FIGS. 5 and 6 respectively showing the frame 4 in the low position and in the high position, the movable part moves in translation relative to the fork 28 when the frame 4 moves relative to the base 2. According to this embodiment, the branches 30 of the fork 28 have a length greater than the diameter of the crosspiece 18, when the latter forms the movable part, and arranged so that the crosspiece 18 remains in the housing formed by the fork 28 in all frame 4 positions.

It is understood that the movable end of the arm 22 could be mounted on another part of the frame 4, for example another crosspiece of the frame of the frame 4, as indicated previously.

According to another embodiment, not shown in the figures, the angular position sensor 20 is mounted on the frame 4 and the arm 22 extends between the angular position sensor 20 and a movable part relative to the angular position sensor when the frame 4 is moved relative to the base 2. The moving part is in this case for example secured to the connecting rod 16. Thus, the movable part can also in this case be formed by the crosspiece 18 extending between the two connecting rods 16. Alternatively, the movable part can be, according to this embodiment, integral with the base 2 and be for example formed by a crosspiece extending between the two sides 8 of the base 2.

As for the first embodiment, the axis of rotation of the arm 22 can coincide with the axis of rotation of the connecting rod 16 with respect to the frame 4, in which case the distance between the movable part and the axis of rotation R' is constant when frame 4 is moved relative to base 2. As a variant, the axis of rotation of the arm 22 is offset with respect to the axis of rotation of the connecting rod 16 with respect to the frame 4, in which case the distance between the movable part and the axis of rotation is variable when the frame 4 is moved relative to the base 2 and in which case the length of the branches 30 of the fork 28 must be adapted accordingly. The operation of the measuring device is the same according to this embodiment as that described with reference to the first embodiment described above.

According to another embodiment, the arm 22 and the connecting rod 16 can be combined, that is to say that the connecting rod 16 forms the arm 22 mounted on the rotating part 24 of the angular position sensor 20. The use of a separate arm 22 is however advantageous in that it simplifies the mounting of the measuring device on a seat, in particular a previously assembled seat.

The measuring device makes it possible to determine in a simple manner the distance between the frame 4 and the base 2 by measuring the variation of the variable characteristic of the angular position sensor 20 driven by the rotation of the arm 22 itself driven by the displacement of the frame 4 with respect to the base 2. The measurement of the variation of the characteristic is converted into a distance between the frame 4 and the base 2, for example by an electronic control unit of the vehicle.

In the case of a measurement of the height of the seat cushion in relation to the vehicle floor, this information can be used to offer functions specific to the seat, such as a memory of the positions occupied by the frame, allowing to reproduce a particular adjustment according to the preferences of the occupants of the seat, and/or to provide users with morphological advice.

It will be noted that the measuring device does not depend on a motor actuating the displacement of the frame 4 with respect to the base 2. Thus, the measuring device can be used in a manually operated seat. In addition, the measuring device is inexpensive and unlikely to become dirty, unlike an optical, ultrasonic or other system. Finally, the measuring device can be mounted on seats already installed in a vehicle.

The illustrated embodiment of the invention was described with reference to determining the height of the seat cushion. It is however understood that the invention can be applied to other parts of the seat, for example to determine the inclination of a backrest with respect to the cushion or other.

The invention claimed is:

1. A vehicle seat comprising a base and a frame,
    wherein a position of the frame relative to the base is adjustable by an adjustment device comprising at least one connecting rod articulated to the base and to the frame, a rotational displacement of the connecting rod causing a displacement of the frame relative to the base to separate the frame from or bring the frame closer to the base,
    the seat further comprising a measuring device for measuring a distance between the base and the frame, wherein the measuring device comprises at least one angular position sensor mounted on the base or on the frame and an arm articulated on the angular position sensor and extending between the angular position sensor and a movable part that is movable with respect to the angular position sensor when the frame is moved relative to the base,
    said arm moving in rotation when the connecting rod is moved in rotation to change the position of the frame relative to the base, said angular position sensor determining the distance between the frame and the base as a function of an angle of rotation of the arm.

2. The vehicle seat according to claim 1, wherein the angular position sensor comprises a rotating part and a measuring part having a characteristic that varies according to rotation of the rotating part, the measuring part being mounted on the base or on the frame and the arm being mounted on the rotating part of the angular position sensor, the arm driving the rotating part in rotation when said arm moves in rotation.

3. The vehicle seat according to claim 1, wherein the angular position sensor is mounted on the base and the movable part is attached to the frame or to the connecting rod.

4. The vehicle seat according to claim 1, wherein the angular position sensor is mounted on the frame and the movable part is integral with the base or the connecting rod.

5. The vehicle seat according to claim 1, wherein a movable end of the arm comprises a fork, the movable part being formed by a crosspiece received in said fork.

6. The vehicle seat according to claim 5, wherein the crosspiece forming the movable part extends between two connecting rods hinged to the base and to the frame, the crosspiece extending parallel to an axis of rotation of said connecting rods with respect to the base and to the frame.

7. The vehicle seat according to claim 1, wherein the angular position sensor is a resistive potentiometer.

8. The vehicle seat according to claim 7, wherein an electrical resistance of the potentiometer has a linear relationship with the angle of rotation of the arm, the distance between the frame and the base being determined by measuring said electrical resistance of the potentiometer.

9. The vehicle seat according to claim 1, further comprising an actuating device for manually actuating movement of the frame with respect to the base, manual actuation of said actuating device causing the connecting rod to move relative to the base.

10. The vehicle seat according to claim 1, wherein the base is a seat base for mounting on a vehicle floor and the frame forms part of a height-adjustable seat cushion having a height that is adjustable relative to the seat base, the measuring device determining said height of said seat cushion.

11. A vehicle seat comprising a base and a frame,
    wherein a position of the frame relative to the base is adjustable by an adjustment device comprising at least one connecting rod articulated to the base and to the frame, a rotational displacement of the connecting rod causing a displacement of the frame relative to the base to separate the frame from or bring the frame closer to the base,
    the seat further comprising a measuring device for measuring a distance between the base and the frame, wherein the measuring device comprises at least one angular position sensor mounted on the base or on the frame and an arm articulated on the angular position sensor and extending between the angular position sensor and a movable part that is movable with respect to the angular position sensor when the frame is moved relative to the base,
    said arm moving in rotation when the connecting rod is moved in rotation to change the position of the frame relative to the base, said angular position sensor determining the distance between the frame and the base as a function of the angle of rotation of the arm,
    wherein a movable end of the arm comprises a fork, the movable part being formed by a crosspiece received in said fork, and
    wherein an axis of rotation of the arm on the angular position sensor coincides with an axis of rotation of the connecting rod relative to the base or to the frame, the crosspiece being immobile relative to the fork during the movement of the frame relative to the base.

12. The vehicle seat according to claim 11, wherein the angular position sensor comprises a rotating part and a measuring part having a characteristic that varies according to rotation of the rotating part, the measuring part being mounted on the base or on the frame and the arm being mounted on the rotating part of the angular position sensor, the arm driving the rotating part in rotation when said arm moves in rotation.

13. The vehicle seat according to claim 11, wherein the angular position sensor is a resistive potentiometer.

14. The vehicle seat according to claim 11, further comprising an actuating device for manually actuating movement of the frame with respect to the base, manual actuation of said actuating device causing the connecting rod to move relative to the base.

15. The vehicle seat according to claim 11, wherein the base is a seat base for mounting on a vehicle floor and the frame forms part of a height-adjustable seat cushion having a height that is adjustable relative to the seat base, the measuring device determining said height of said seat cushion.

16. A vehicle seat comprising a base and a frame,
wherein a position of the frame relative to the base is adjustable by an adjustment device comprising at least one connecting rod articulated to the base and to the frame, a rotational displacement of the connecting rod causing a displacement of the frame relative to the base to separate the frame from or bring the frame closer to the base,
the seat further comprising a measuring device for measuring a distance between the base and the frame, wherein the measuring device comprises at least one angular position sensor mounted on the base or on the frame and an arm articulated on the angular position sensor and extending between the angular position sensor and a movable part that is movable with respect to the angular position sensor when the frame is moved relative to the base,
said arm moving in rotation when the connecting rod is moved in rotation to change the position of the frame relative to the base, said angular position sensor determining the distance between the frame and the base as a function of the angle of rotation of the arm,
wherein a movable end of the arm comprises a fork, the movable part being formed by a crosspiece received in said fork, and
wherein an axis of rotation of the arm on the angular position sensor is parallel to and spaced from an axis of rotation of the connecting rod relative to the base or to the frame, the crosspiece moving in translation in the fork of the arm when the frame moves relative at the base.

17. The vehicle seat according to claim 16, wherein the angular position sensor comprises a rotating part and a measuring part having a characteristic that varies according to rotation of the rotating part, the measuring part being mounted on the base or on the frame and the arm being mounted on the rotating part of the angular position sensor, the arm driving the rotating part in rotation when said arm moves in rotation.

18. The vehicle seat according to claim 16, wherein the angular position sensor is a resistive potentiometer.

19. The vehicle seat according to claim 16, further comprising an actuating device for manually actuating movement of the frame with respect to the base, manual actuation of said actuating device causing the connecting rod to move relative to the base.

20. The vehicle seat according to claim 16, wherein the base is a seat base for mounting on a vehicle floor and the frame forms part of a height-adjustable seat cushion having a height that is adjustable relative to the seat base, the measuring device determining said height of said seat cushion.

* * * * *